US010223509B2

(12) United States Patent
Lin

(10) Patent No.: US 10,223,509 B2
(45) Date of Patent: Mar. 5, 2019

(54) DEVICE OF LICENSING PROGRAM, PROGRAM TRANSACTION DEVICE AND METHOD OF LICENSING PROGRAM

(71) Applicant: BOTHNIC INFORMATION CO. LTD., Changhua County (TW)

(72) Inventor: Kuan-Ju Lin, Changhua County (TW)

(73) Assignee: BOTHNIC INFORMATION CO. LTD., Changhua County (TW)

( * ) Notice: Subject to any disclaimer, the term of this patent is extended or adjusted under 35 U.S.C. 154(b) by 183 days.

(21) Appl. No.: 14/909,529

(22) PCT Filed: Aug. 2, 2013

(86) PCT No.: PCT/CN2013/080695
§ 371 (c)(1),
(2) Date: Feb. 2, 2016

(87) PCT Pub. No.: WO2015/013974
PCT Pub. Date: Feb. 5, 2014

(65) Prior Publication Data
US 2016/0171190 A1    Jun. 16, 2016

(51) Int. Cl.
*G06F 21/10* (2013.01)

(52) U.S. Cl.
CPC ............ *G06F 21/105* (2013.01); *G06F 21/10* (2013.01); *G06F 2221/0771* (2013.01); *G06F 2221/0773* (2013.01)

(58) Field of Classification Search
CPC ................... G06F 21/105; G06F 21/10; G06F 2221/07771; G06F 2221/0773
See application file for complete search history.

(56) References Cited

U.S. PATENT DOCUMENTS 5,838,910 A * 11/1998 Domenikos ............. G06F 9/445
                                                       709/203
6,134,659 A * 10/2000 Sprong ................. G06F 21/121
                                                       380/255
(Continued)

FOREIGN PATENT DOCUMENTS

CN        102034059 A       4/2011
CN        102567685 A       7/2012
(Continued)

OTHER PUBLICATIONS

Working Memory—Technology UK, Nov. 5, 2010, 4 pages https://www.technologyuk.net/computing/computer-systems/working-memory.shtml.*
(Continued)

*Primary Examiner* — Catherine Thiaw
(74) *Attorney, Agent, or Firm* — Volpe and Koenig, P.C.

(57) ABSTRACT

A device for licensing a program including a header includes a storage device, a file system and a license verification component. The storage device is in a local terminal having a random access memory (RAM). The file system is configured in the storage device. The operating system (OS) receives a starting-program command to activate the program and stores the header into the storage device. The license verification component prevents the OS from loading the program in the RAM, and works with at least one of the OS and a remote server to perform a license verification, wherein after there is a license verification pass, the license verification component allows the program to be loaded in the RAM.

20 Claims, 10 Drawing Sheets

(56) References Cited

U.S. PATENT DOCUMENTS

| | | | | |
|---|---|---|---|---|
| 2003/0156719 A1* | 8/2003 | Cronce | G06F 21/10 | 380/256 |
| 2004/0168056 A1* | 8/2004 | Dillaway | G06F 21/10 | 713/156 |
| 2006/0047604 A1* | 3/2006 | Kraft-Oz | G06F 9/44573 | 705/59 |
| 2007/0067243 A1* | 3/2007 | Malik | G06Q 30/06 | 705/59 |
| 2007/0100762 A1* | 5/2007 | Luo | G06F 21/105 | 705/59 |
| 2007/0143630 A1* | 6/2007 | Zunke | G06F 21/123 | 713/189 |
| 2008/0098465 A1* | 4/2008 | Ramakrishna | G06F 21/10 | 726/5 |
| 2012/0079601 A1* | 3/2012 | Gava | G06F 21/10 | 726/26 |
| 2012/0166619 A1* | 6/2012 | Mefford, Jr. | G06F 21/10 | 709/224 |
| 2012/0216269 A1* | 8/2012 | Yeung | G06F 21/10 | 726/11 |
| 2013/0067188 A1* | 3/2013 | Mehra | G06F 3/0605 | 711/170 |
| 2014/0122658 A1* | 5/2014 | Haeger | H04L 29/0854 | 709/219 |
| 2015/0213237 A1* | 7/2015 | Kruglick | G06F 21/105 | 726/26 |

FOREIGN PATENT DOCUMENTS

| | | | | |
|---|---|---|---|---|
| CN | 102685727 A | | 9/2012 | |
| WO | WO 2005/125072 | * | 12/2005 | H04K 1/00 |

OTHER PUBLICATIONS

Representing executable files—Computer Science from the Bottom Up, Dec. 13, 2010, 2 pages https://www.bottomupcs.com/resenting_executable.xhtml.*

International Search Report dated May 19, 2014 in corresponding International Patent Application No. PCT/CN2013/080695, consisting of 5 pp. (English Translation Provided).

* cited by examiner

DEVICE OF LICENSING PROGRAM, PROGRAM TRANSACTION DEVICE AND METHOD OF LICENSING PROGRAM

CROSS REFERENCE TO RELATED APPLICATION

This application claims the benefit of the International Patent Application No. PCT/CN2013/080695, filed on Aug. 2, 2013, at the World Intellectual Property Office, the disclosures of which are incorporated herein in their entirety by reference.

TECHNICAL FIELD

Embodiments in the present disclosure are related to a method of licensing a program, and more particularly to a method of licensing a program in a cloud.

BACKGROUND

Cloud storage refers to a mode of storing on-line data on the internet, i.e., storing the on-line data in a plurality of virtual servers managed by a third party agent, but not to an exclusive server. A data center provider prepares virtualized resources to store the on-line data at the back end according to customers' demands, provides the customer with a storage pool, and then the customer can use the storage pool to store files or objects. Cloud computing is a kind of computing based on the internet. Through this method, shared software resources and messages can be supplied to the computer and other devices on demand. Cloud computing describes an increasing service based on a new information technology (IT) of the internet, usage and delivery and payment modes, involves dynamic transaction expansion functions provided through the internet, and is usually virtualized resources. A user can access service software and data, and the service provider maintains the basic infrastructure and platform to keep the service operating normally. The service or the software provided by the service provider is usually called "software-on-demand", being charged based on usage time. The user only needs to have low complexity software and hardware equipment to use these services, so this can save costs for the enterprise. Because the application is supplied centrally, updates to the application can be deployed instantly, and the user does not need to perform update manually or install new software. Therefore, cloud computing allows the enterprise to deploy applications quickly, reduce complexity of management, and allow prompt redistribution of IT resources in response to rapid changes of the enterprise's requirements.

The benefit to the user or the enterprise regarding the concept of the cloud is that there is no need to purchase every kind of hardware equipment and software with powerful processing capability, maintenance and updates are performed by the service provider, and the user or the enterprise "virtualizes" the hardware equipment and software as much as possible. However, the user or the enterprise subscriber will get a serial number after purchasing, and the software can be used only if the serial number is verified during installation of the software or activation of the program. Generally speaking, the user waits for Email to acquire the serial number or must obtain the serial number at a physical store, spending several minutes to days. In addition, a key generator can be used to generate the serial number or crack the software. Therefore piracy issues commonly occur.

Please refer to FIG. 1, which shows a flow diagram for licensing a program in the prior art. In Step S101, the subscriber system receives an application program activation command. In Step S102, the subscriber system loads the application program into a memory, the memory can include a hard disk or a random access memory (RAM), the application program can be loaded on the hard disk of the subscriber system from the server of the service terminal through the internet, and then the application program is loaded into the RAM for execution from the hard disk. The application software can be directly loaded into the RAM of the subscriber system for execution from the enterprise's internal file server. In Step S103, the application program judges whether the application program has a license, and if the application program passes the license verification, then the flow goes to Step S104. If the application program does not pass the license verification, then the flow goes to Step S105. In Step S105, the application program requests the user to enter a verification code, the flow goes to Step S104 when the verification is successful, and the flow will go to Step S106 if the verification fails.

In the steps of licensing the program in the prior art, all of the application program content is loaded into the memory to perform the license verification, so the application program can be easily copied or altered, which can avoid the process of licensing verification, therefore leading to piracy of the software. Another scheme in the prior art performs the license verification by using a specific program for the license verification, but it does not cause the operating system to do the license verification under the control of a device driver in the operating system at the user terminal, so the completion and the security of the license verification decrease, leading to rampant piracy of the software. In addition, this kind of program must be written according to each specific application for the license verification. If the file of the application program can be accessed through a definite flow process, then there is no need to write a specific program for the license verification according to each different application program. Therefore, it is expected that a method wherein the device driver of the subscriber system can inform the OS to perform the license verification before the software is loaded into the hard disk or RAM, and wherein the device driver allows the software to be loaded into the RAM after the license verification passes, can prevent piracy issues.

Regarding the number of software licenses in each enterprise, it is common that an enterprise will buy several licenses according to how many computers the enterprise has, and only computers with the license installed can be used after the software installation. Because the same serial number can be installed on two different computers or devices, which does not comply with the stipulations of the software license, if another computer without the installation needs to be used, the software license needs to be uninstalled from the original computer before the software can be installed on another computer, i.e., the software usage right depends on different hardware devices. The drawback of this license method, in addition to the inconvenient step of uninstallation, is that the enterprise still needs to buy a number of computer licenses when the number of licenses is smaller than the number of computers in the enterprise, so the method of licensing the software is not flexible. Therefore, it is expected that a method of licensing the software that is not associated with the computer or the device number, will enable the enterprise to more successfully manage the number of the software licenses.

SUMMARY OF EXEMPLARY EMBODIMENTS

In accordance with one embodiment of the present disclosure, a method for licensing a program is disclosed. The program is stored in at least one of a remote server and a storage device at a local terminal having an operating system (OS), a license verification component and a random access memory (RAM) and including a plurality of executable files including a first executable file having a first header and a second executable file having a second header, the method comprising steps of: causing the OS to receive a program-start command to activate the program; causing the OS to store the first header in the storage device, and causing the license verification component to prevent the OS from loading the first executable file in the RAM to be executed; causing the license verification component to work with at least one of the OS and the remote server to perform a license verification; allowing the first executable file to be loaded in the RAM for execution when the first executable file passes the license verification; and when the second executable file is to be used, causing the OS to read the second header and performs another license verification through the license verification component and one of the OS and the remote server.

In accordance with one embodiment of the present disclosure, a device for licensing a program is disclosed. The program includes a header, and the device comprises a storage device, a file system, an operating system (OS) and a license verification component. The storage device is on a local terminal having a random access memory (RAM). The file system is configured in the storage device. The operating system (OS) receives a program-start command to activate the program and stores the header in the storage device. The license verification component prevents the OS from loading the program in the RAM, and works with at least one of the OS and a remote server to perform a license verification, wherein after the license verification passes, the license verification component allows the program to be loaded in the RAM.

In accordance with a further embodiment of the present disclosure, the present invention discloses a device for licensing a program.
The device for licensing a program comprises a storage unit and a license verification component. The storage unit stores and executes a program. The license verification component initially causes the program to be halted from execution, and licenses the program for execution when the license verification passes.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Please refer to all Figs. of the present invention when reading the following detailed description, wherein all Figs. of the present invention demonstrate different embodiments of the present invention by showing examples, and help the skilled person in the art to understand how to implement the present invention. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1:
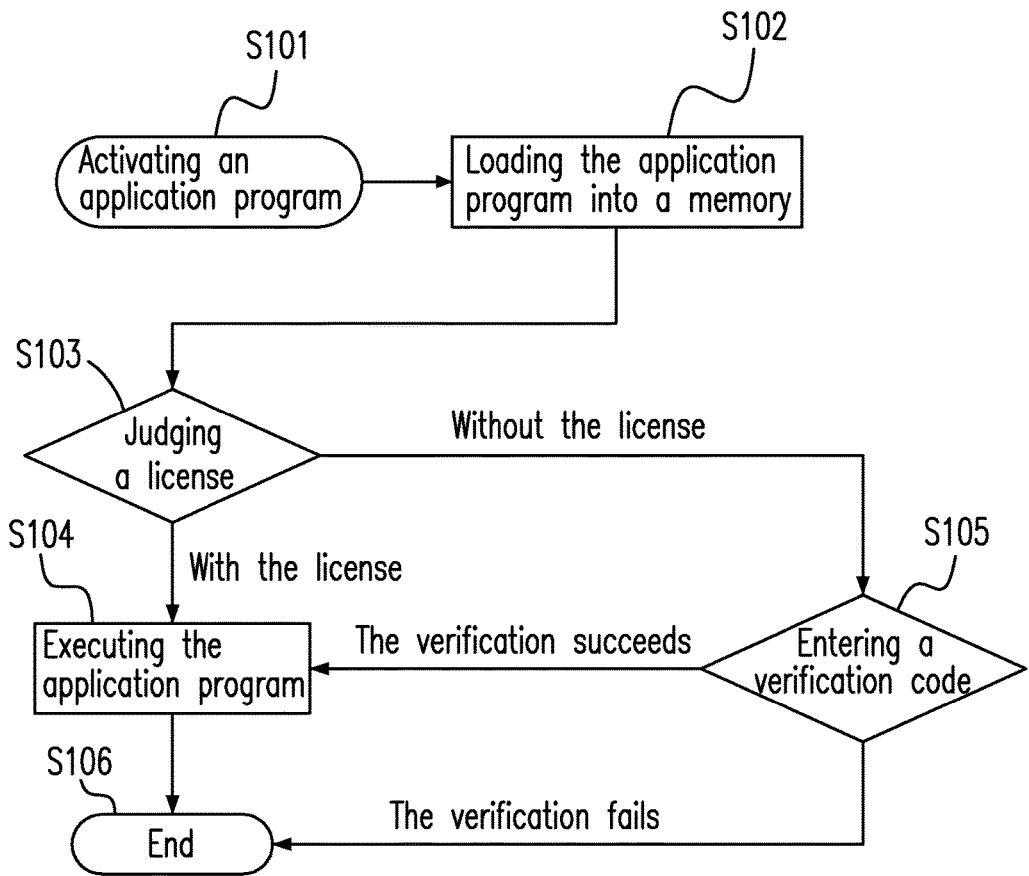
FIG. 1 shows a flow diagram of licensing a program in the prior art.
Figure 2:
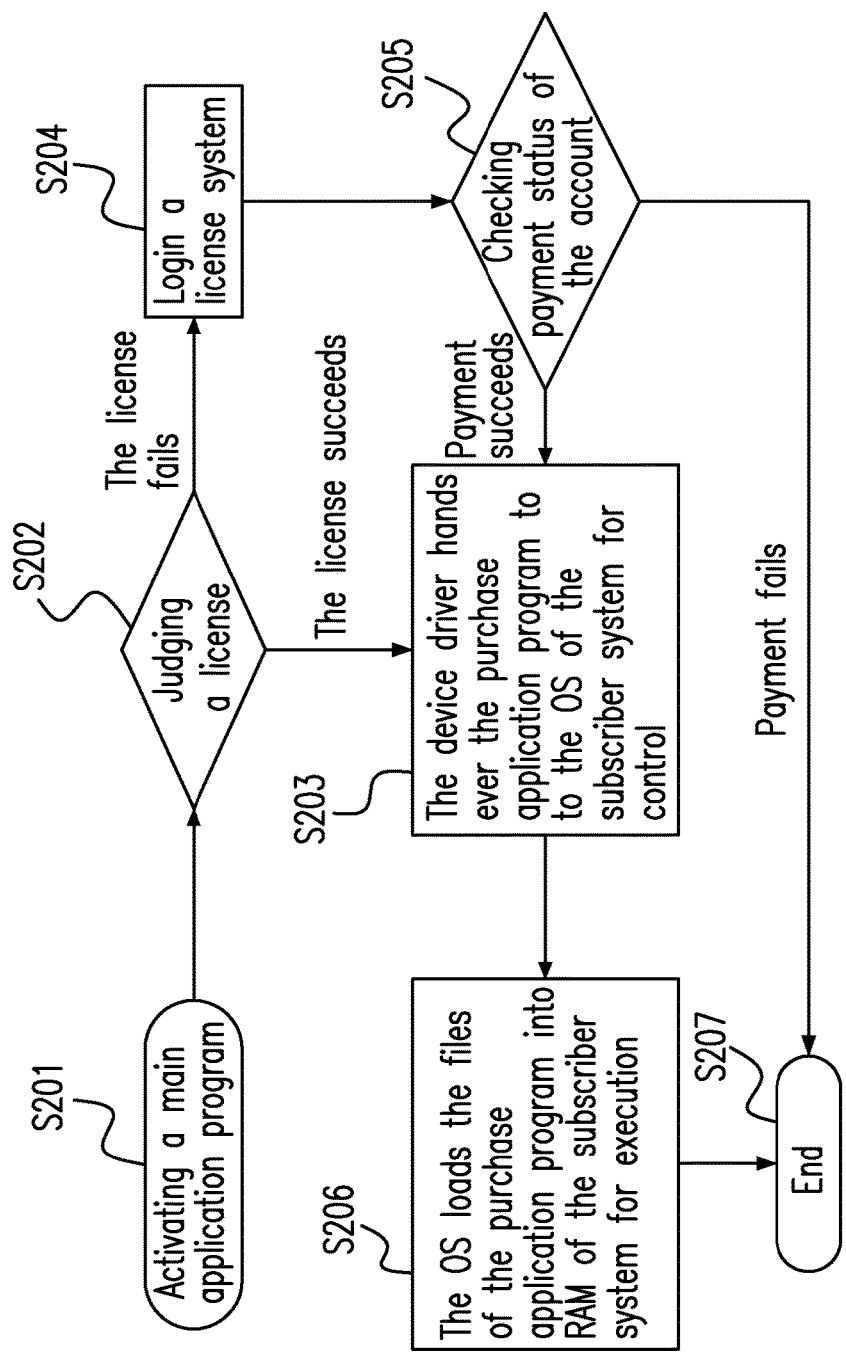
FIG. 2 shows a flow diagram of licensing a program according to the preferred embodiment of the present disclosure.

Please refer to FIG. 2, which shows a flow diagram for licensing a program according to the preferred embodiment of the present disclosure. The subscriber system needs to install a main application program before a program transaction platform can be used. The main application program is freely provided to the subscriber to download and install, and the main application program includes a device driver communicating with an OS and a hardware device and memory space information that the OS of the subscriber system needs to read. In Step S201, the subscriber system receives an application program activation command. In Step S202, a license is judged. In Step S202, the OS of the subscriber system transmits the license data to a remote server for license verification before accessing files (or a file) of a purchased application program. When the OS of the subscriber system goes to read the files of the purchased application program, a device driver will stop reading the files of the purchased application program, and the license verification is performed by the OS of the subscriber system at this time. When the license verification is successful, the device driver allows the OS to read the files of the purchased application program, and the flow goes to Step S203. When the license verification fails, the flow goes to Step S204. In Step S203, the device driver hands over the purchased application program to the OS of the subscriber system for control. In Step S204, the remote server requests the subscriber to provide an account and password to login the license system on the remote server. In Step S205, the remote server checks payment status of the account. When the payment status of the account is paid, the flow goes to Step S203, and then enters Step S206 and Step S207 in order. When the payment status of the account is non-payment, the flow enters Step S207. In Step S206, the OS loads the files of the purchased application program into a RAM of the subscriber system for execution. In Step S207, the main application program is terminated.

Figure 3:
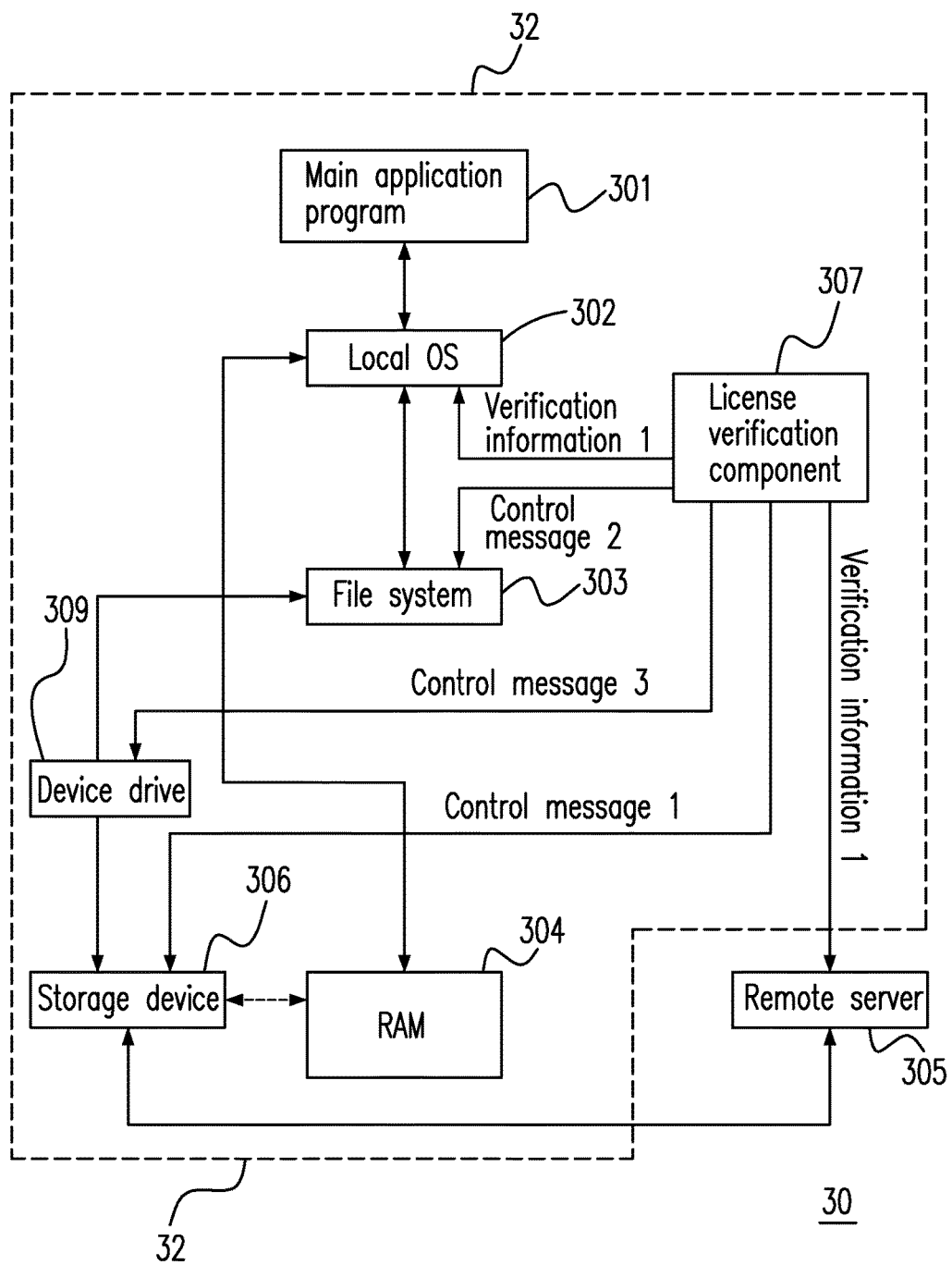
FIG. 3 shows a program transaction system according to the preferred embodiment of the present disclosure.

Please refer to FIG. 3, which shows a program transaction system 30 according to the preferred embodiment of the present disclosure. The program transaction system 30 includes a program transaction device 32 and a remote server 305. The program transaction device 32 includes a first storage component, a second storage component and a license verification component 307. For example, the first storage component is a storage device 306, and the second storage component is a RAM 304. The first storage component stores a program database from the remote server 305, and the program database includes a plurality of programs, i.e., the desired purchased application programs. The second storage component provides a local OS 302 for storage, so that the subscriber can select a specific program from the plurality of programs. The license verification 307 cooperates with the local OS 302 or the remote server 305 to perform license verification. After the license verification passes, the specific program is allowed to be executed.

In FIG. 3, the program transaction device 32 further includes a main application program 301, a local OS 302, a device driver 309 and a file system 303. When the desired purchased application program is selected to be executed, the local OS 302 will read a header of the purchase application program in order to confirm the required memory size information of the purchased application program, the OS 302 allocates a new process to the purchased application program, and starts the new process. During this time, the license verification component 307 is activated to transmit verification information 2, and performs the license verification with the remote server 305. After the license verification component 307 is informed that the license verification has passed, the license verification component 307 transmits the control messages 1, 2 and 3 to control the storage device 306, file system 303 and device driver 309 respectively, so that the files of the purchased application program is allowed to be stored into the storage device 306 from the remote server 309, the purchased application program is stored into the file system 303 from the storage device 306 through the device driver 309, and the local OS 302 loads the purchased application program into the RAM 304 from the file system 303 for execution. In some embodiments, the license verification can also transmit verification information 1 towards the local OS 302 to perform the license verification. After the license verification passes, similarly, the license verification component 307 transmits the control messages 1 and 2 to allow the purchase application program to be loaded into the RAM 304 for execution from the program database of the remote server 305. In FIG. 3, the dashed line between the storage device 306 and the RAM 304 represents that the files of the purchased application program are stored indirectly therebetween, i.e., data files of the purchased application program need to be loaded to the RAM 304 for execution through the storage device 306, the device driver 309, the file system 303 and the local OS 302.

In FIG. 3, storage device 306 can be a hard disk of the remote server 305, a local hard disk, a special purpose RAM block, e.g. a RAM disk and an arbitrary combination thereof. The place for storing the purchased application program can be different according to design requirements, and the file system 303 designates where to store the files of the purchased application program. In order to cause the local OS 302 to store data from a specific file in a specific location, the file system 303 is simulated on the storage device 306 to be used to receive the commands from the local OS 302, so as to store data from the specific file in the specific location. The license verification can include a part of the device driver 309 and the main application program 301, or the main application program 301 can include the device driver 309 and the license verification component 307. The job of the license verification component 307 is to cooperate with the local OS 302 and the remote server 305 in order to perform the license verification. In addition, after the license verification passes, the license verification component allows the files of the purchased application program to be stored on the storage device 306, to be stored on the file system 303 from the storage device 306, or allows the OS 302 to load files of the purchased application program into the RAM 304 from the file system 303; and this depends on whether the license verification component 307 can control the hard disk of the storage device 306, file system 303 and the remote server 305. This invention discloses that the license verification component 307 prevents the files of the purchased application program from being transmitted to the file system 303 from the storage device 306, or causes the local OS 302 to prevent the files of the purchased application program from being loaded into the RAM 304 from the file system 303.

When the files of the purchased application program are loaded into the RAM 304, the local OS 302 will call a loading entrance of the application program according to the loading entrance of the application program recorded in the header of the files of the purchased application program, and then the OS 302 hands over the execution authority to the new process.

Figure 4:
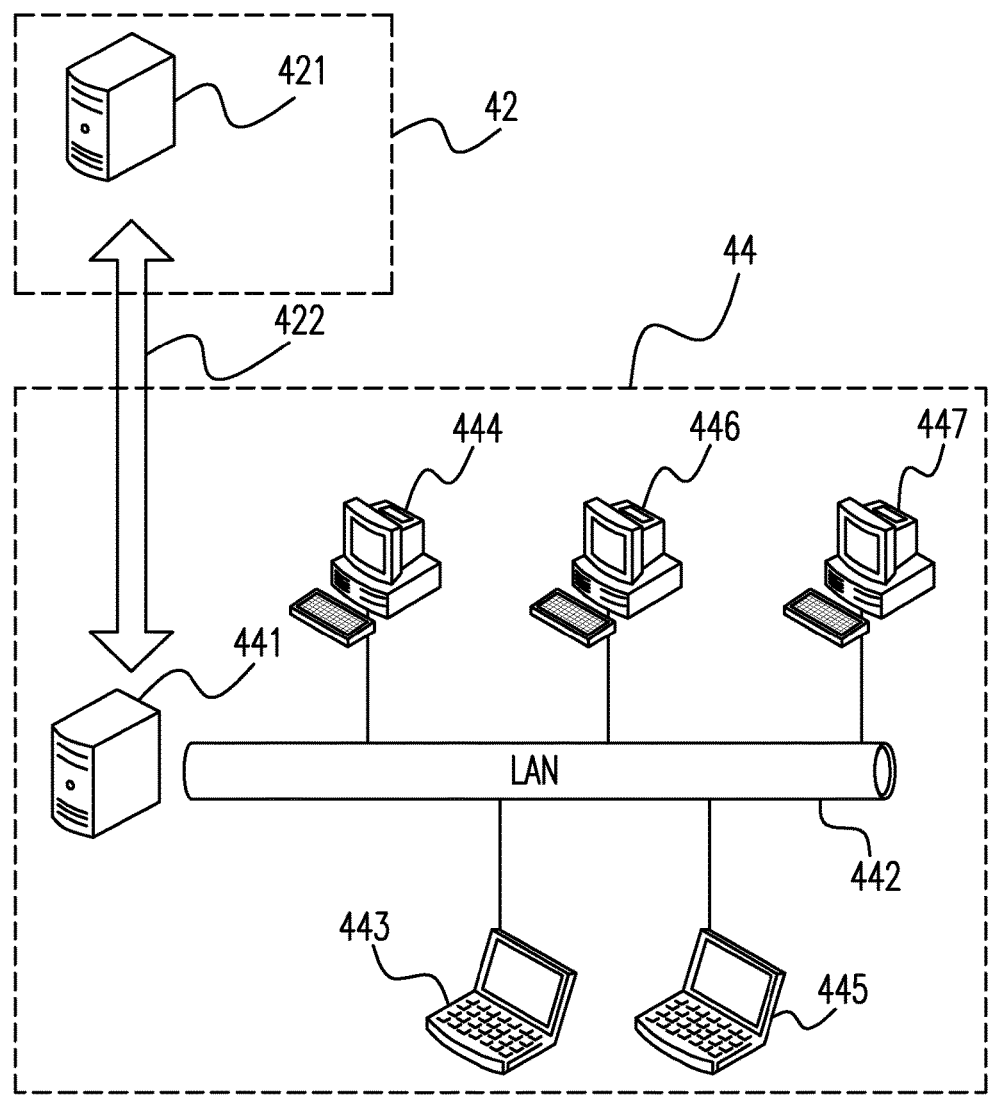
FIG. 4 shows a cloud system for licensing according to the preferred embodiment of the present disclosure.

Please refer to FIG. 4, which shows a cloud system 40 for licensing according to the preferred embodiment of the present disclosure. The cloud system 40 includes a public cloud 42 in the external environment of the enterprise and a private cloud 44 in the internal environment of the enterprise. The public cloud 42 includes a cloud host 421. The application program software in the cloud host 421 can be distributed to the software host 441 of the enterprise after the enterprise purchases a specific number of application program software licenses. Then the software host 441 distributes the specific number of application software programs to the plurality of computer hosts 443, 444, 445, 446 and 447. FIG. 4 shows that the cloud host 421 is connected to the software host 441 of the enterprise through an internet 422. In some embodiments, the cloud host 421 can be connected to the plurality of software hosts, and each of the plurality of software host is owned by a different enterprise.

In FIG. 4, the license verification between the cloud host 421 and the software host 441 in the internal enterprise and the usage of the files of the purchased application program can be managed by the cloud host 421. The cloud host 421 holds a first secret key which is used as a signature for a license number. The software host 441 in the internal enterprise holds a second secret key which is used to verify the license number. The enterprise needs to buy a specific number of licenses, the cloud host 421 encrypts the data for the license number using the first secret key, and then the cloud host 421 uses the encrypted data for the license number as a signature authentication. Therefore, if data for the license number is altered, then the encrypted data of the license number will be inconsistent with the data for the signature authentication, the data authenticated by the signature is transmitted to the software host 441 of the internal enterprise through the internet 422, and the software host 441 uses the second secret key to decrypt the data authenticated by the signature in order to verify the license number. Therefore, if the license number is altered, the data authenticated by the signature will not match each other during the verification, and the cloud host 421 will directly reject all licensing actions. If the signature is confirmed, then the files of the purchase application program can be downloaded to the software host 441 in the internal enterprise through the internet 422. Alternatively, the information technology (IT) manager in the enterprise can store the data authenticated by the signature into another computer, and then use the other computer to download the purchased application program through the internet 422. The off-line download of the software host 441 can avoid the risk of being hacked or infected.

In FIG. 4, the software host 441 in the internal enterprise can manage the license numbers authenticated by the cloud host 421. In some preferred embodiments, a local area network (LAN) 442 in the internal enterprise has totally five computer hosts 443, 444, 445, 446 and 447, but only three suites of the purchased application program are used at the same time, so only a license having a license number with a value of 3 is required to buy. For example, the computers 443 and 444 are installed with the main application program, and they use the same purchased application program at the same time. The software host 441 will record how many computer hosts use the purchase application program, and subtract two from the license number in the software host 441. After the computer host 445 is installed by the main application program and uses the same purchase application program, the license number is further subtracted by one. When the computer host 446 is installed with the main application program and uses the same purchased application program, the software host 441 will not allow the computer host 446 to execute the purchased application program because the license number has become zero or a negative value indicating that the license number verified by the software host 441 was exceeded. When the computer host 443 is not using the purchased application program, the purchased application program stored in the storage device as shown in FIG. 3 will not be loaded into the RAM 304 for execution by the local OS 302, and the license number in the software host is increased by one. Therefore, one of the computer hosts 446, 447 and two computer hosts 444, 445 can use the same purchased application program simultaneously.

In one preferred embodiment, in FIG. 3, the program transaction device 32 is the software host 441. In another preferred embodiment, the program transaction device 32 is any one of the plurality of the computer hosts 443, 444, 445, 446 and 447, and the remote server 305 is the software host 441. The internal license verification component 307 in the software host 441 does not allow the purchased application program to be loaded into the RAM 304 for execution on the condition that the license verification does not pass. Similarly, regarding any one of the plurality of the computer hosts 443, 444, 445, 446 and 447, its internal license verification component 307 does not allow the purchased application program to be stored on the storage device 306 or to be loaded into the RAM 304 before the verification of the license number passes.

When the plurality of the computer hosts 443, 444, 445, 446 and 447 are in different LANs, due to a slow network speed or the high latency, the files of the purchased application program can be stored in the storage device 306. Then, the files of the purchased application program are loaded into the RAM 304 for execution from the storage device 306 through the file system 303 and the local OS 302.

The user who uses the computer host in the internal enterprise needs to login an account of the internal enterprise, and the account has different authorities according to different identities. After one of the computer hosts 443~447 passes the license verification, the software host 441 will issue a token having the authority associated with the account. The local OS 302 in the licensed computer host or the license verification component 307 determines how the purchased application program is dealt with according to the token. For example, the purchased application program can be loaded into the RAM 304, or the purchased application program to be loaded will be interrupted. Similarly, the cloud host 421 can also be a license verification server. When the enterprise subscriber logs into the software host 441 using the account having a specific authority, the cloud host 421 in the public cloud 42 will license the software host 441 according to the specific authority, and this causes the files of the application program purchased by the enterprise subscriber to be downloaded to the software host 441. The local OS 302 in the software host 441 or the license verification component 307 determines how the purchased application program is dealt with according to the token. For example, the files of the purchases application program are loaded into the RAM 304, or the files of the purchases application program are prevented from loading.

The files of the purchases application program will be stored to the storage device 306 after licensing. In order to prevent the files of the purchased application program from being copied, all of these files have specific secret keys encrypted for protection, the specific secret keys are in the token, and only the files of the purchased application program having the token are allowed to be downloaded. When the files of the purchased application program are executed in the computer host 443, the activated token will be recorded by the software host 441 and will be kept in a record, i.e., the license number count will be recorded by the software host 441. If the record is deleted, then the files of the purchased application program cannot be read. If the license number is altered on the condition that the cloud host 421 is offline, then the license verification component 307 will prevent the files of the purchased application program from being loaded into the RAM 304 of the computer host 443 from the remote server 305 of the software host 441.

The license verification can be divided into complete licensing or a partial licensing according to how many files of the purchased application program are used. When the purchased application program includes a plurality of application programs having different functions, the plurality of application programs can be divided into different files according to the function. Thus, partial licensing is performed on the different files.

Figure 5:
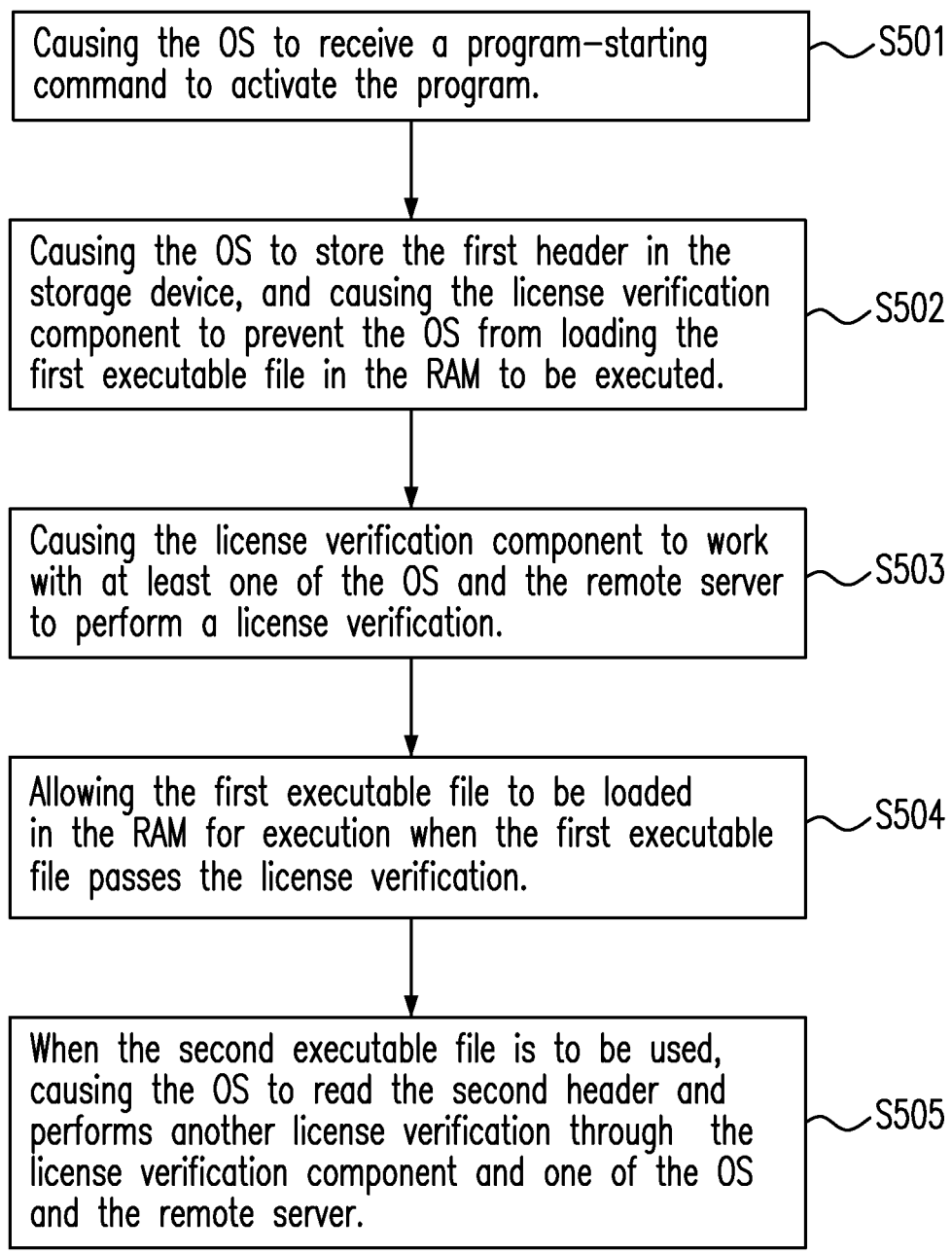
FIG. 5 shows a method for licensing a program according to the preferred embodiment of the present disclosure.

Please refer to FIG. 5, which shows a method for licensing a program according to the preferred embodiment of the present disclosure. The program is stored in at least one of a remote server and a storage device in a local terminal having an operating system (OS), a license verification component and a random access memory (RAM), and includes a plurality of executable files, wherein the plurality of executable files include a first executable file having a first header and a second executable file having a second header. The method includes the following steps. The OS receives a program-start command to activate the program (Step S501). The OS stores the first header in the storage device, and causes the license verification component to prevent the OS from loading the first executable file in the RAM from being executed (Step S502). The license verification component works with at least one of the OS and the remote server to perform a license verification (Step S503). The first executable file is allowed to be loaded into the RAM for execution when the first executable file passes the license verification (Step S504). When the second executable file is to be used, the OS reads the second header and performs another license verification through the license verification component and one of the OS and the remote server (Step S505).

In FIG. 5, when there is a license verification failure, the license verification component causes the OS to read an abort file to terminate a licensing procedure for the program, or causes the OS to be unable to read the purchased application program, so as to cause the purchased application program to make errors, therefore terminating the purchased application program. The license verification includes one selected from a group consisting of a permanent license verification, a lease license verification and a trial license verification based on a valid period. When the license verification is the permanent license verification, the program is allowed to be used without an expiration date. When the license verification is the lease license verification, the program is allowed to be used during a specific period of time. When the license verification is the trial license verification, the program is available until the expiration date.

The license verification further includes one of a network license verification and a telephone license verification. The network license verification uses a first grant code to perform the license verification, and the first license code includes a message associated with personal privacy data including one selected from the group consisting of an identification number, birthday and a combination thereof. The telephone license verification uses a telephone number to perform the license verification, the telephone number is used to acquire a second license code when the telephone license verification is performed, and the second license code is used to pass the telephone license verification. By using the personal privacy for verification, it can prevent someone from sharing the license code, and this can prevent the program from being pirated if the purchased application program was not paid for.

After the license verification passes, the OS acquires a token. The token includes an anonymous token and a non-anonymous token. The anonymous token is used with a public computer, and the non-anonymous token is used with a private computer. The purpose of the token is to allow the purchased application program to be anonymously accessed, but when the computer is shut down, the files of the purchased application program will be deleted, therefore it is applied to a public computer. The purpose of the non-anonymous token is to allow the purchased application program to be accessed, but the files of the purchased application program will not be deleted if the computer is shut down, and therefore it is applied to a private computer.

Figure 6:
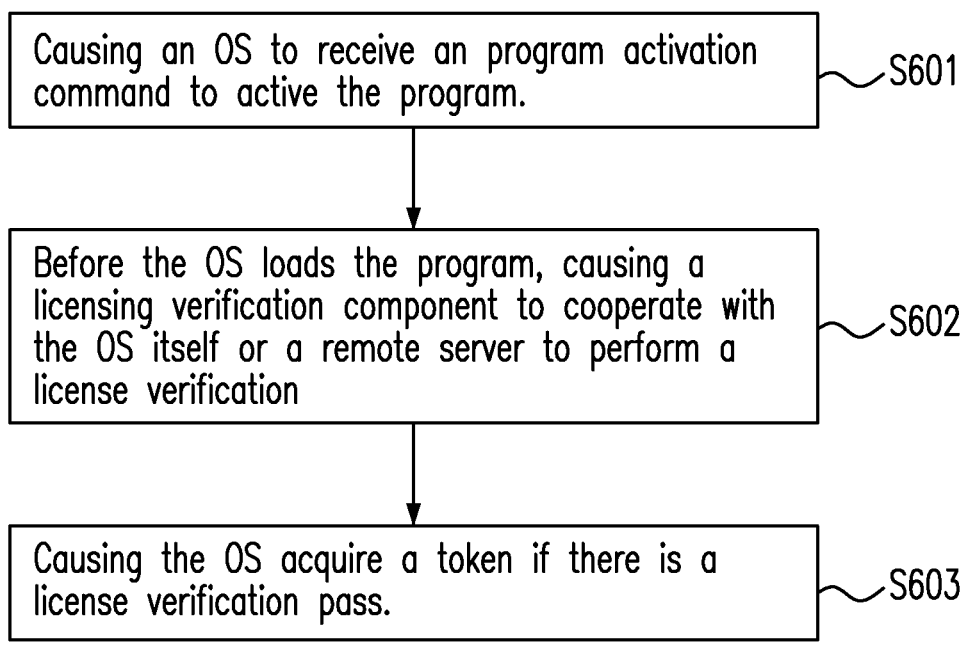
FIG. 6 shows a method for licensing a program according to the preferred embodiment of the present disclosure.

Please refer to FIG. 6, which shows a method of licensing a program according to the preferred embodiment for the present disclosure. The method of licensing a program includes the following steps. An OS receives a program activation command to activate the program (Step S601). Before the OS loads the program, a licensing verification component cooperates with the OS itself or a remote server to perform a license verification. In Step S603, the OS acquires a token if the license verification passes (Step S602).

The token includes a secret key, and the files of the purchased application program can be decrypted for reading only if it has the secret key. The license verification includes one selected from a group consisting of a permanent license verification, a lease license verification and a trial license verification. When the license verification is one of the lease license verification and the trial license verification, the license verification component cooperates with the remote server to perform the license verification. When the license verification is the permanent license verification and the remote server is not available, the license verification coordinates with the OS to perform the license verification. In such a situation, although a temporary license verification can be performed, the subscriber will be forced to connect to the remote server for the license verification after a predetermined period of time, e.g., after a week. This can ensure that the purchased application program will not be pirated.

In FIG. 6, the method of licensing a program further includes the following steps. If the license verification passes, the anonymous token is verified after the program is shut down, and the program data reverts to a default value. If the license verification passes by the non-anonymous verification token, after the program is shut down, the program data remains in its original state.

Figure 7A:
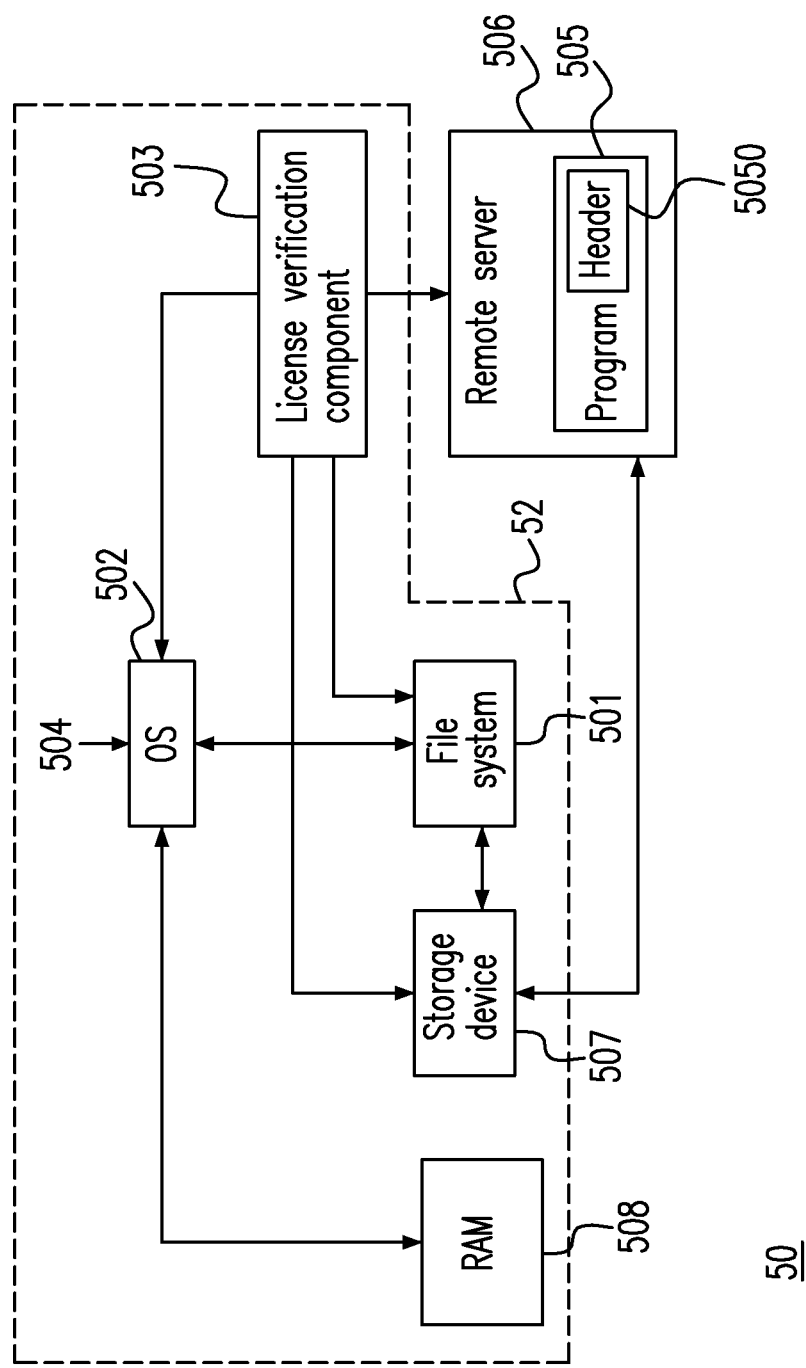
FIG. 7(a) shows a system for licensing a program according to the preferred embodiment of the present disclosure.

Please refer to FIG. 7(a), which shows a system 50 for licensing a program according to the preferred embodiment of the present disclosure. The system 50 includes a licensing program device 52, and a remote server 506. The licensing program device 52 includes a file system 501, a storage device 507, an OS 502 and a license verification component 503. A software database in the remote server 506 includes the program 505, and the program 505 includes a header 5050. The OS 502 receives a program activation command 504 to active the program 505, and stores the header in the storage device 507 in order that the OS 502 can read the header 5050. The license verification component 503 prevents the OS 502 from loading the program 505 into a RAM 508 for execution, and cooperates with the OS 502 or the remote server 506 to perform a license verification. If the license verification passes, the license verification component 503 allows the program 505 to be continuously loaded into the RAM 508 for execution.

In another embodiment, the program 505 has not been saved to the storage device 507, but the license verification component 503 stops the program from being stored on the storage device 507. The license verification component 503 cooperates with the OS 502 and the remote server 506 to perform the license verification. If the license verification passes, the license verification component 503 allows the program 505 to be stored on the storage device 507, and the OS 502 loads the program 505 into the RAM 508 from the file system 501 for execution.

Figure 7B:
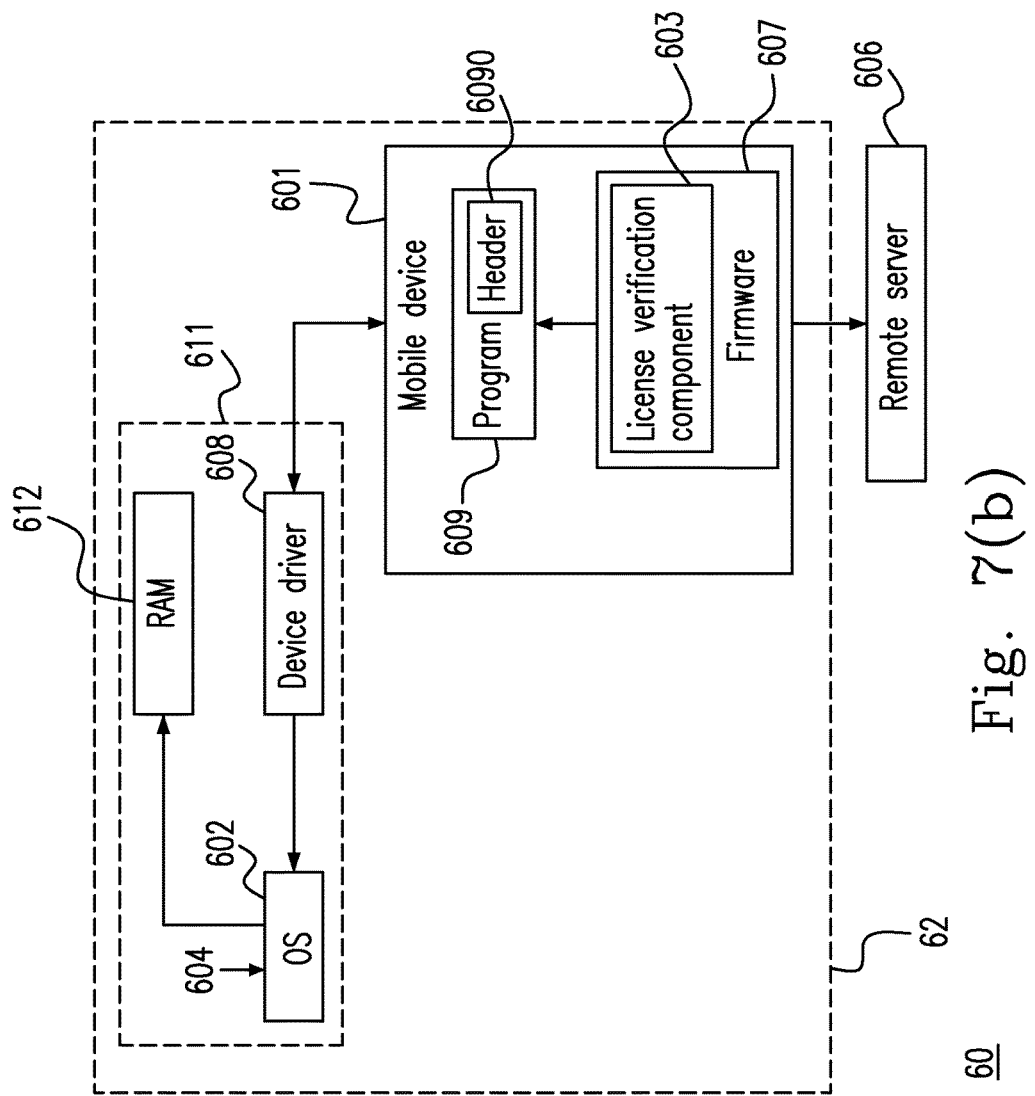
FIG. 7(b) shows a system for licensing a program according to another preferred embodiment of the present disclosure.

Please refer to FIG. 7(b), which shows a system 60 for licensing a program according to another preferred embodiment of the present disclosure. The system 60 includes a licensing program device 62 and a remote server 606. The licensing program device 62 includes a mobile device 601 and a host 611. The mobile device 601 includes firmware 607 and the program 609. The program 609 includes a header 6090. In one preferred embodiment, the OS 602 receives a program activation command 604 to activate the program 609, and reads the header 6090.

In FIG. 7(b), the OS 602 and the mobile device 601 are controlled by a device driver 608 between the OS 602 and the mobile device 601. The firmware 607 includes the license verification component 603, and cooperates with the device driver 608 to transmit and control the program 609. When the mobile device 601 is coupled with the host 611, the header 6090 of the program 609 is previously read into a RAM 612 through the device driver 608 and the OS 602 before the license verification, and then the OS 602 receives a program activation command 604 and allocates a new process to the program 609 for activation. During this time, the license verification component 603 is activated to cause the OS 602 to cooperate with the firmware 607 through the device driver 608 in order to perform the license verification. Before the license verification passes, the firmware 607 interrupts the program 609 transmitted to the host 611 from the mobile device. The device driver 608 interrupts the OS 604 to load the program 609 into the RAM 612 for execution.

After the license verification passes, the firmware 607 allows the program 609 to be transmitted to the host 611 without interruption, and the device driver 608 allows the program 609 to be loaded into the RAM 612 for execution through the OS 602 without being interrupted by the device driver 608. In another embodiment, the license verification can be performed by cooperation between the license verification component 603 and the remote server 606, or between the license verification component 603 and the OS 602.

In FIG. 7(b), the mobile device 601 can be a portable hard disk, and the OS 602 includes one selected from a group consisting of an embedded OS, Windows® OS, Linux OS and Solaris OS.

Figure 8:
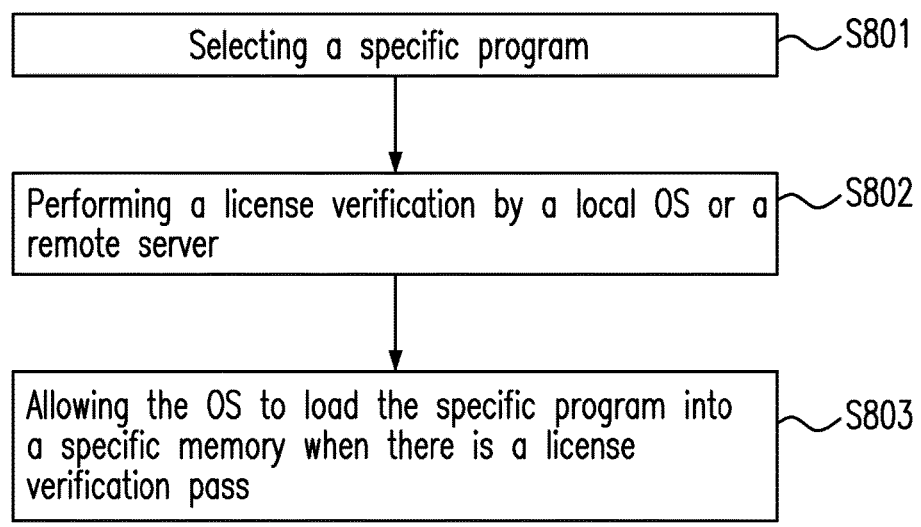
FIG. 8 shows a method for licensing a program according to another preferred embodiment of the present disclosure.

Please refer to FIG. 8, which shows a method for licensing a program according to another preferred embodiment of the present disclosure. The method includes the following steps. A specific program is selected (Step S801). A license verification is performed by a local OS or a remote server (Step S802). The OS is allowed to load the specific program into a specific memory when the license verification passes (Step S803).

In FIG. 8, the specific memory is selected by a user for a memory path, and the method further includes a step of: causing the specific program to be stored in a software host from a cloud host, and transmitting the specific program to a LAN host from the software host. The method further includes a step of: interrupting the program's execution, and the license verification component allows the program to be continuously executed until the license verification passes.

Figure 9:
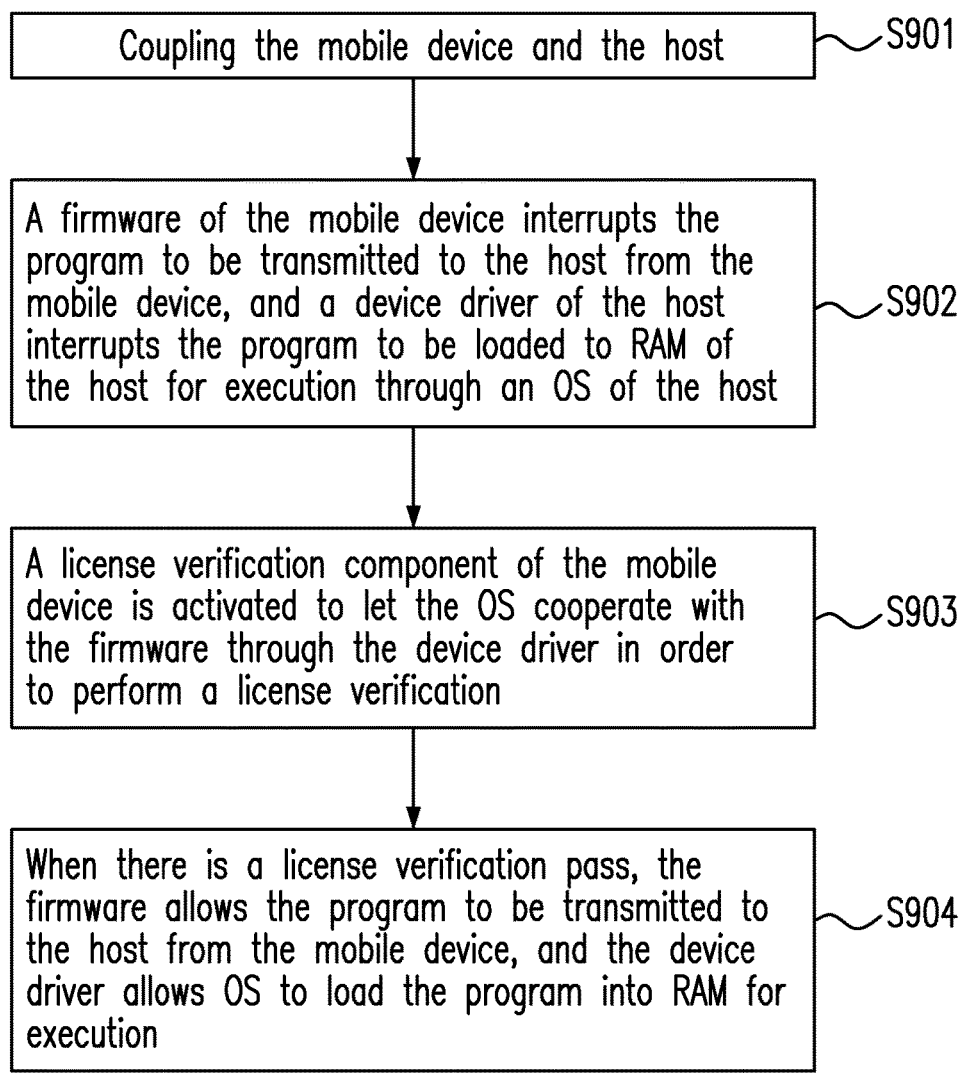
FIG. 9 shows a method for licensing a program in a program transaction device according to the preferred embodiment of the present disclosure.

Please refer to FIG. 9, which shows a method for licensing a program 609 in a program transaction device 62 according to the preferred embodiment of the present disclosure. The program transaction device 62 includes a host 611 and a mobile device 601. The method includes the following steps. The mobile device 601 is coupled with the host 611 (Step S901). A firmware 607 of the mobile device 601 interrupts the program 609 being transmitted to the host 611 from the mobile device 601, and a device driver 608 of the host 611 interrupts the program 609 being loaded into a RAM 612 of the host 611 for execution through an OS 602 of the host 611 (Step S902). A license verification component 603 in the mobile device 601 is activated to cause the OS 602 to cooperate with the firmware 607 through the device driver 608 in order to perform a license verification (Step S903). When the license verification passes, the firmware 607 allows the program 609 to be transmitted to the host 611 from the mobile device 601, and the device driver 608 allows the OS 602 to load the program 609 into the RAM 612 for execution (Step S904).

EMBODIMENTS

1. A method of licensing a program, stored in at least one of a remote server and a storage device in a local terminal having an operating system (OS), a license verification component and a random access memory (RAM) and including a plurality of executable files including a first executable file having a first header and a second executable file having a second header, the method comprising steps of: causing the OS to receive a program-start command to activate the program; causing the OS to store the first header in the storage device, and causing the license verification component to prevent the OS from loading the first executable file in the RAM to be executed; causing the license verification component to work with at least one of the OS and the remote server to perform a license verification; allowing the first executable file to be loaded in the RAM for execution when the first executable file passes the license verification; and when the second executable file is to be used, causing the OS to read the second header and performs another license verification through the license verification component and one of the OS and the remote server.

2. The method in Embodiment 1, further comprising one of the steps of: causing the OS to read an aborting file to terminate a licensing procedure of the program, when there is a license verification failure; stopping the OS from reading the program and causing the program to generate errors to terminate the licensing procedure when there is the license verification failure; and when the second executable file passes the another license verification, causing the license verification component to allow the second executable file to be loaded in the RAM.

3. The method of any one of Embodiments 1-2, further comprising: causing one of the OS and the storage device to acquire a token when there is a license verification pass.

4. The method of any one of Embodiments 1-3, wherein the token includes an anonymous token and a non-anonymous token. The anonymous token is used with a public computer, and the non-anonymous token is used with a private computer.

5. The method of any one of Embodiments 1-4, wherein if the license verification pass is verified, the anonymous token is verified after the program is shut down, the program has a datum recovered to a default value. If the license verification pass is verified by the non-anonymous verification token after the program is shut down, the program has a datum kept in its original state.

6. The method of any one of Embodiments 1-5, wherein the license verification includes one selected from a group consisting of a permanent license verification, a lease license verification and a trial license verification. When the license verification is one of the lease license verification and the trial license verification, the license verification component cooperates with the remote server to perform the license verification. When the license verification is the permanent license verification and the remote server is not available, the license verification coordinates with the OS to perform the license verification.

7. The method of any one of Embodiments 1-6, further comprising the steps of: choosing the program; causing the program to be stored in a software host from a cloud host; and transmitting the program to a local area network host from the software host.

8. A device for licensing a program including a header comprises a storage device, a file system and a license verification component. The storage device is in a local terminal having a random access memory (RAM). The file system is configured in the storage device. The operating system (OS) receives a starting-program command to activate the program and stores the header into the storage device. The license verification component prevents the OS from loading the program in the RAM, and works with at least one of the OS and a remote server to perform a license verification, wherein after there is a license verification pass, the license verification component allows the program to be loaded in the RAM.

9. The device in Embodiment 8, wherein the device further includes a device driver. In response to the license verification pass, the license verification component transmits at least one of a first, a second and a third control messages to control the storage device, the file system and the device driver respectively.

10. The device of any one of Embodiment 8-9, wherein the first control message allows the program to be stored into the storage device from the remote server. The second control message allows the program to be stored into the file system from the storage device through the device driver. The third control message allows the program to be loaded in the RAM from the file system for execution through the OS.

11. The device of any one of Embodiments 8-10, wherein the license verification include at least one of a permanent license verification, a lease license verification and a trial license verification. When the license verification is the permanent license verification, the program is allowed to be used without an expiration date. When the license verification is the trial license verification, the program is available until the expiration date.

12. The device of any one of Embodiments 8-11, wherein the license verification further includes a network license verification. The network license verification uses a first grant code to perform the license verification. The first license code includes a message associated with a personal privacy including one selected from the group consisting of an identification number, birthday and a combination thereof.

13. The device of any one of Embodiments 8-12, wherein the license verification further includes a telephone license verification. The telephone license verification uses a telephone number to perform the license verification. The telephone number is used to acquire a second license code when the telephone license verification is performed, and the second license code is used to pass the telephone license verification.

14. A device for licensing a program comprises a storage unit and a license verification component. The storage unit stores and executes a program. The license verification component initially causes the program to be halted from execution, and licenses the program for execution when there is a license verification pass.

15. A device in Embodiment 14, wherein the storage unit includes a first storage component storing a remote program database including a plurality of programs, and a second storage component. The first storage component is one of a proxy server hard disk and a cloud hard disk, and the second storage component is a random access memory (RAM). The license verification component cooperates with at least one of a local operating system (OS) and a remote server to perform a license verification, initially prevents the local OS from loading the program in the RAM, and allows the program to be loaded into the RAM for execution after having the license verification pass.

16. The device of any one of Embodiments 14-15, wherein the storage unit includes a random access memory (RAM) having a first memory space and a second memory space, wherein the first memory space is a RAM disk for storage of the program, and the second memory space is used to execute the program. The license verification component cooperates with at least one of a local operating system (OS) and a remote server to perform a license verification. When the device is a software host, the remote server is a cloud host, the license verification is performed at the cloud host, and the program is stored in the software host. When the device is the software host and the remote server is not available, the license verification is performed at the software host, and the program is stored in a local area network (LAN) computer. When the device is the LAN computer, the remote server is the software host, the license verification is performed at the software host, and the program is stored in the LAN computer.

17. The device of any one of Embodiments 15-16, wherein the license verification component cooperates with at least one of a local operating system (OS) and a remote server to perform a license verification. When the license verification is one of a lease license verification and a trial license verification, the license verification component cooperates with the remote server to perform the license verification. When the license verification is a permanent license verification and the remote server is not available, the license verification component cooperates with the local OS to perform the license verification.

18. The device of any one of Embodiments 15-17, further comprises a host, a mobile device. The host includes a local OS, a random access memory (RAM) and a device driver. The mobile device is coupled with the host and includes a firmware including the license verification component.

19. The device of any one of Embodiments 15-18, wherein when the mobile device is coupled to the host, the firmware prevent the program from being transmitted to the host from the mobile device, and the device driver prevents the OS from loading the program into the RAM for execution, the license verification component is activated to cause the local OS to cooperate with the firmware to perform a license verification by using the device driver.

20. The device of any one of Embodiments 15-19, wherein when there is the license verification pass, the firmware allows the program to be transmitted to the host from the mobile device, and the device driver allows the program to be loaded in the RAM for execution through the local OS.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of licensing a purchased program stored in one of a remote server or a local terminal, having an operating system (OS), a storage device, an activation program, a license verification component and a random access memory (RAM), wherein the purchased program includes a plurality of executable files including a first executable file having a first header and a second executable file having a second header, the method comprising steps of:

the OS receiving a program activation command from the activation program to activate the purchased program;

the OS storing the first header in the storage device, and causing the license verification component to prevent the OS from loading the first executable file into the RAM to be executed prior to a license verification;

the license verification comprising a first verification and another verification;

the license verification component implemented in software, working with at least one of the OS and the remote server to perform the first verification wherein the first verification includes a device driver, the OS accesses a file system through the device driver;

when the first verification passes, the license verification component transmits at least one control message to indicate whether the first executable file of the purchased program can be read by the OS from the file system through the device driver, allowing the first executable file to be loaded into the RAM for execution; and when the second executable file is to be used, the OS reading the second header and another verification is performed through the license verification component and at least one of the OS and the remote server, when the second executable file passes the another verification, the license verification component transmits at least one additional control message to indicate whether the purchased program can be read by the OS from the file system through the device driver, allowing the purchased program to be loaded into the RAM.

2. The method as in claim 1, further comprising one of the steps of:
the OS reading an aborting file to terminate a licensing procedure of the purchased program when there is a license verification failure; and
the OS stopping reading the purchased program and the purchased program generating errors to terminate the licensing procedure when there is the license verification failure.

3. The method as in claim 1, further comprising:
one of the OS and the storage device acquiring a token when there is a license verification pass.

4. The method as in claim 3, wherein:
the token includes an anonymous token and a non-anonymous token; and
the anonymous token is used with a public computer, and the non-anonymous token is used with a private computer.

5. The method as in claim 4, wherein:
after the license verification passes, the OS acquires the anonymous token to allow the purchased program to be accessed, wherein the purchased program has a datum recovered to a default value after the purchased program is shut down; or
after the license verification passes, the OS acquires the non-anonymous token to allow the purchased program to be accessed, wherein the purchased program has a datum kept in its original state after the program is shut down.

6. The method as in claim 1, wherein:
the license verification includes one selected from a group consisting of a permanent license verification, a lease license verification and a trial license verification;
when the license verification is one of the lease license verification and the trial license verification, the license verification component cooperates with the remote server to perform the license verification; and
when the license verification is the permanent license verification and the remote server is not available, the license verification component coordinates with the OS to perform the license verification.

7. The method as in claim 1, further comprising the steps of:
choosing the purchased program;
causing the purchased program to be stored in a software host from a cloud host; and
transmitting the purchased program to a local area network host from the software host.

8. A device for licensing a purchased program including a first executable file and a second executable file, comprising:
a storage device in a local terminal having an activation program and a random access memory (RAM);
a file system configured in the storage device;
an operating system (OS) receiving a program activation command from the activation program to activate the purchased program and storing the header in the storage device; and
a license verification component implemented in software, preventing the OS from loading the purchased program into the RAM prior to a license verification, and working with one of the OS and a remote server to perform a license verification,
the license verification comprising a first verification and another verification for a license verification pass,
the license verification further includes a device driver, the OS accesses the file system through the device driver,
wherein after there is a first verification pass, the license verification component transmits at least one control message to allow the first executable file of the purchased program to be loaded into the RAM; and when the second executable file passes the another verification, the license verification component transmits at least one control message to indicate whether the purchased program can be read by the OS from the file system through the device driver.

9. The device as in claim 8, wherein:
in response to the license verification pass, the license verification component transmits a first, a second and a third control messages to control the storage device, the file system and the device driver respectively.

10. The device as in claim 9, wherein:
the first control message allows the purchased program to be stored in the storage device from the remote server;
the second control message allows the purchased program to be stored in the file system from the storage device through the device driver; and
the third control message allows the purchased program to be loaded into the RAM from the file system for execution through the device driver and the OS.

11. The device as in claim 8, wherein:
the license verification includes one of a permanent license verification, a lease license verification and a trial license verification;
when the license verification is the permanent license verification, the purchased program is allowed to be used without an expiration date;
when the license verification is the trial license verification, the purchased program is available until the expiration date.

12. The device as in claim 8, wherein:
the license verification further includes a network license verification;
the network license verification uses a first grant code to perform the license verification; and
the first grant code includes a message associated with a personal privacy including one selected from the group consisting of an identification number, birthday and a combination thereof.

13. The device as in claim 8, wherein:
the license verification further includes a telephone license verification;
the telephone license verification uses a telephone number to perform the license verification; and
the telephone number is used to acquire a second license code when the telephone license verification is performed, and the second license code is used to pass the telephone license verification.

14. A licensing program device for licensing a purchased program including at least two executable files, comprising:
a local operating system (OS);
a storage unit storing and executing the purchased program;

a file system arranged in the storage unit; and a license verification component implemented in software, preventing the purchased program from being loaded into the storage unit prior to a license verification, and licensing the purchased program for execution when there is a license verification pass, wherein the license verification includes a first verification, another verification, and a device driver, the local OS accesses the file system through the device driver, upon a first verification pass the device driver, in response to a control message transmitted by the license verification component, allows the first executable file of the purchased program to be executed, and upon an another verification pass, the license verification component transmits an additional control message to the file system to indicate whether the purchased program can be read by the local OS from the file system through the device driver.

15. The licensing program device as in claim 14, wherein:

the storage unit includes a first storage component storing a remote program database including a plurality of programs, and a second storage component;

the first storage component is one of a proxy server hard disk and a cloud hard disk, and the second storage component is a random access memory (RAM); and the license verification component cooperates with at least one of the local operating system (OS) and a remote server to perform the license verification, initially prevents the local OS from loading the purchased program into the RAM, and allows the purchased program to be loaded into the RAM for execution after having the license verification pass.

16. The licensing program device as in claim 14, wherein:

the storage unit includes a random access memory (RAM) having a first memory space and a second memory space, wherein the first memory space is a RAM disk for storage of the purchased program, and the second memory space is used to execute the purchased program;

the license verification component cooperates with one of the local operating system (OS) and a remote server to perform a license verification;

when the licensing program device is a software host, the remote server is a cloud host, the license verification is performed at the cloud host, and the purchased program is stored in the software host;

when the licensing program device is the software host and the remote server is not available, the license verification is performed at the software host, and the purchased program is stored in a local area network (LAN) computer; and when the licensing program device is the LAN computer, the remote server is the software host, the license verification is performed at the software host, and the purchased program is stored in the LAN computer.

17. The licensing program device as in claim 14, wherein:

the license verification component cooperates with one of the local operating system (OS) and a remote server to perform a license verification;

when the license verification is one of a lease license verification and a trial license verification, the license verification component cooperates with the remote server to perform the license verification; and when the license verification is a permanent license verification and the remote server is not available, the license verification component cooperates with the local OS to perform the license verification.

18. The licensing program device as in claim 14, further comprising:

a host including the local OS, a random access memory (RAM) and a device driver;

a mobile device coupled with the host and including:

a firmware including the license verification component.

19. The licensing program device as in claim 18, wherein:

when the mobile device is coupled to the host, the firmware prevents the purchased program from being transmitted to the host from the mobile device, and the device driver prevents the local OS from loading the purchased program into the RAM for execution, the license verification component is activated to cause the local OS to cooperate with the firmware to perform a license verification by using the device driver.

20. The licensing program device as in claim 19, wherein:

when there is the license verification pass, the firmware allows the purchased program to be transmitted to the host from the mobile device, and the device driver allows the purchased program to be loaded into the RAM for execution through the local OS.

* * * * *